United States Patent [19]
Åsberg

[11] 3,767,221
[45] Oct. 23, 1973

[54] WHEEL SUPPORT FOR A NON-DRIVEN WHEEL OF AN ENGINE PROPELLED ROAD VEHICLE

[75] Inventor: Sture Lennart Åsberg, Savedalen, Sweden

[73] Assignee: SKF Industriele-En Ontwikkeling-Maatschappy N.V.

[22] Filed: Feb. 3, 1971

[21] Appl. No.: 112,284

[52] U.S. Cl................ 280/96.1, 188/18 A, 301/191
[51] Int. Cl............................................... B62d 7/06
[58] Field of Search........................ 301/5, 5.7, 126; 280/96.3, 96.1; 308/191; 188/18 A

[56] References Cited
UNITED STATES PATENTS

| 1,982,377 | 11/1934 | Duby.............................. 301/5 R X |
| 3,295,626 | 1/1967 | Cadiou........................... 280/96.3 X |
| 3,332,518 | 7/1967 | North et al. ...................... 188/18 A |
| 3,552,813 | 1/1971 | Brescia, Jr. et al................ 308/191 |
| 1,975,661 | 10/1934 | Powell............................. 301/5.7 X |
| 1,062,472 | 5/1913 | Kaye................................... 280/96.3 |

Primary Examiner—Kenneth H. Betts
Assistant Examiner—John P. Silverstrim
Attorney—Howson and Howson

[57] ABSTRACT

A preassembled wheel support unit for a nondriven wheel, having inner and outer annular members with confronting raceways for relative rotation and means for connecting one annular member to the vehicle and the other annular member to the wheel and brake disk. The pitch diameter of the raceways is at least twice the overall axial width of the annular members whereby forces resulting from functioning of the brake are acting at substantially the same diameter and close to forces from the wheel and reaction forces from the vehicle.

4 Claims, 7 Drawing Figures

INVENTOR:
STURE LENNART ÅSBERG
BY Howson & Howson
ATTORNEYS

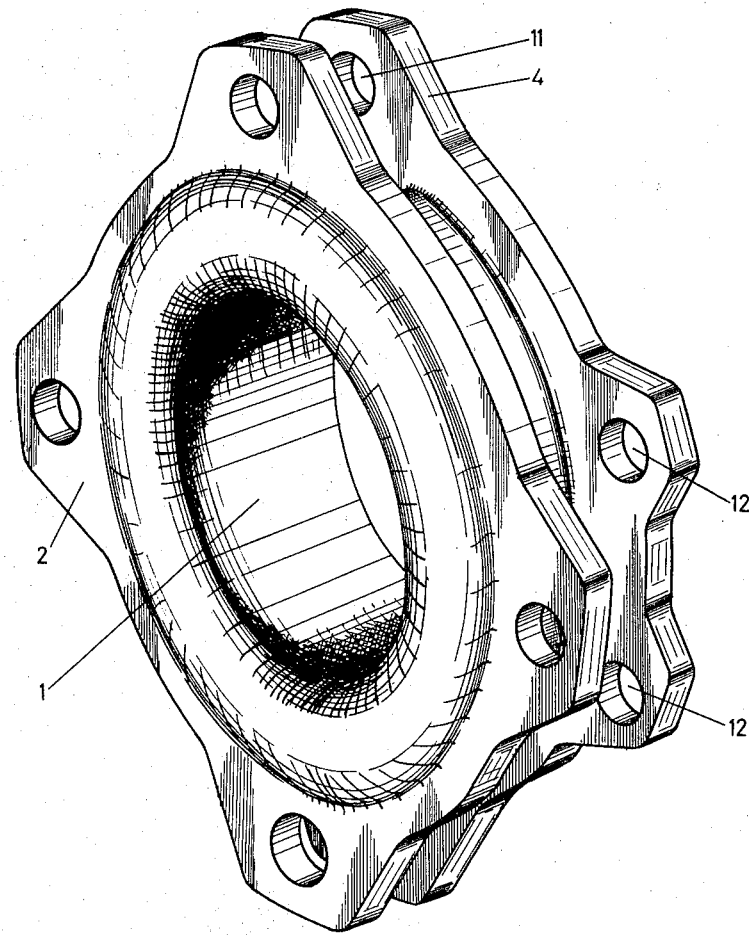

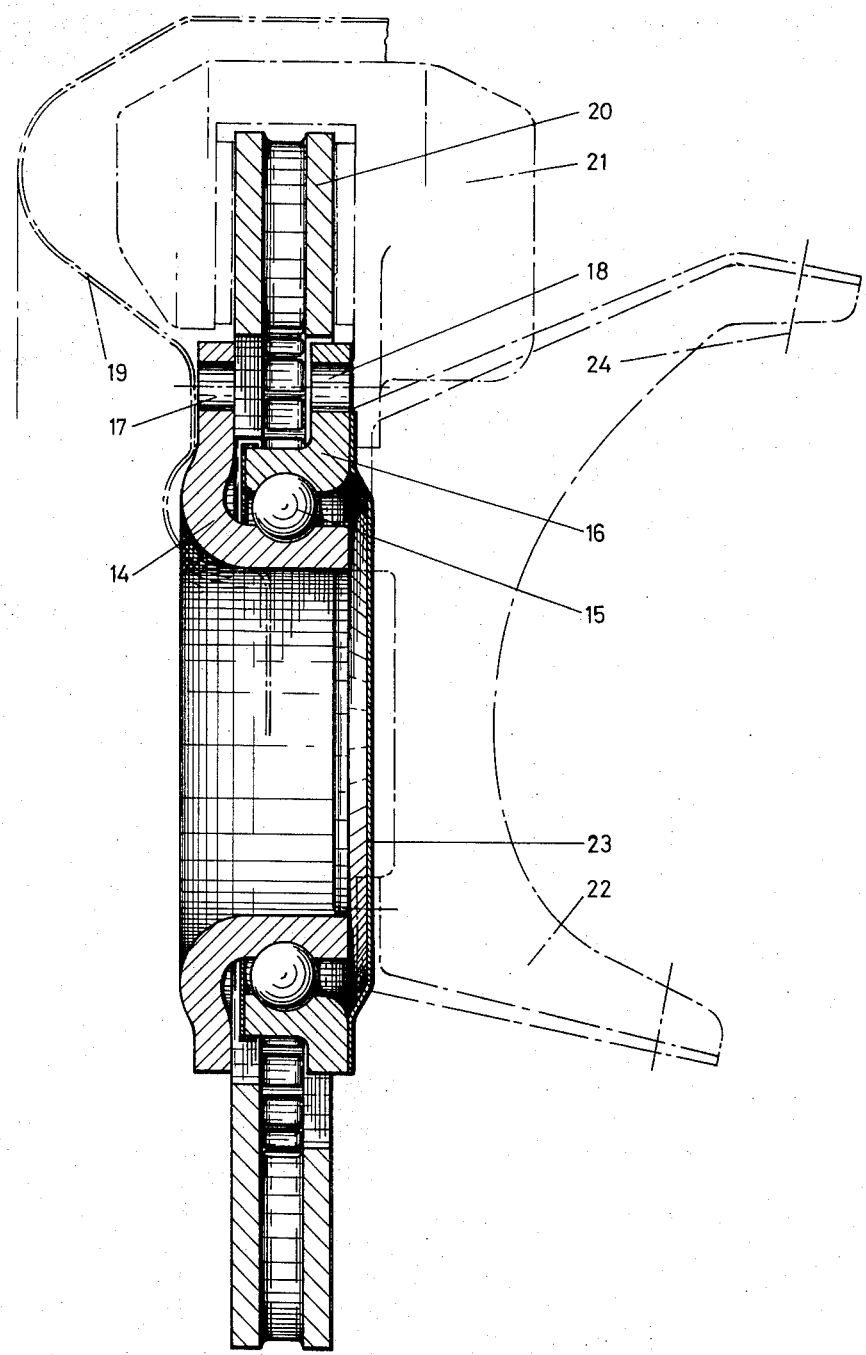

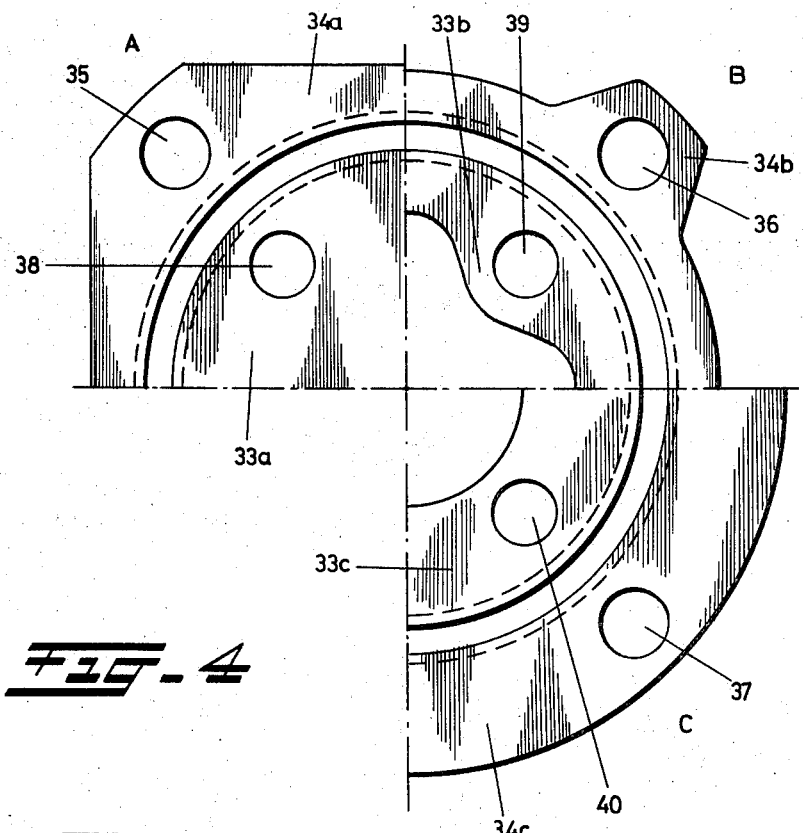
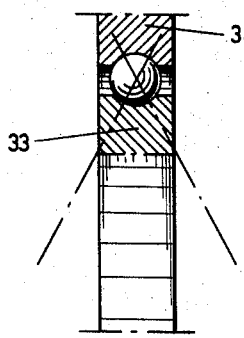

WHEEL SUPPORT FOR A NON-DRIVEN WHEEL OF AN ENGINE PROPELLED ROAD VEHICLE

The present invention relates to a wheel support for a non-driven wheel of an engine propelled road vehicle, adapted to be braked by braking friction elements engaging a brake member secured to the rotating part of the wheel support, said vehicle having at least three wheels, of which at least one can be driven, said wheel support comprising a bearing unit with ball or roller shaped bearing elements, located between annular structural elements of the unit and cooperating with uninterrupted races carried by said elements, each structural member being provided with integral means for detachably connecting the unit to the vehicle on one hand and to the wheel and brake member on the other hand.

A wheel support of this type is known from the published Dutch patent applications 68.05108 and 68.05109, which publications relate to an older proposal according to which the traditional design of the construction for supporting a vehicle wheel has been changed in principle in that bearings with separate race rings mounted on and in seats of an axle and bearing housing respectively are no longer used and according to which a unit has been provided which is light in weight, cheap to manufacture, cheap to install and to repair.

Although in the design of motor cars it has been common practice to support a driven wheel by means of a ball or roller bearing of which the inner part rotates, it also has been common practice to mount the non-driven wheel on a stub axle with the consequence that the inner part which fits on the stub axle is stationary whereas the outer part rotates. It further has been common practice in case of steerable non-driven wheels to use two bearings axially spaced and radially of small diameter.

Although the older proposals according to the above mentioned published Dutch patent applications considerably change the usual design there still remains points open for further development and it is the purpose of this invention to do a further step in this direction as far as a non-driven wheel, steerable or non-steerable is concerned.

According to the invention this is achieved in that the means for attaching the wheel are provided on that structural member of the unit which carries the inner race or races of the bearing. This means with other words that the wheel is secured to the inner rotating but non-driven part. This increases the lifetime of the bearing.

It is known in the technique of rolling bearings that it is better that the inner part rotates and the outer is stationary, but the design of the support for non-driven wheels has been so traditional that even when the invention of the Dutch patent applications mentioned before was done the idea did not occur that the new design of the bearing unit did open the way to further important developments.

An advantage of this idea is that the heat generated in the brake disc or drum connected to said rotating part has to go a longer way before it can reach the bearing so that cooling can be improved. This results from the larger radial distance the greater quantity of material and the larger cooling surface.

In case of a disc braked wheel a further improvement according to the invention is obtained if according to the invention the pitch diameter of the bearing elements of said unit is larger than the axial length of the unit, and axially as well as radially at a distance from the wheel rim such that between the rim and said bearing elements there is only space for a calliper housing of the brake, the brake disc connecting means and an outer structural member for the bearing. Increasing the diameter of a bearing having the inner part rotating, means maximum profit out of the better load distribution resulting from the fact that the inner part rotates and this makes it possible to construct a cheap and light unit.

According to the invention the bearing unit can comprise only one row of balls which have two point contact with each of the races. In its simplest form the bearing unit or wheel support only comprises two concentric parts with bolts in between and holes for the attachment to the wheel and the vehicle respectively.

The invention now will be further elucidated with reference to the drawings.

FIG. 2 shows the embodiment of FIG. 1 in perspective.

FIG. 3 shows another embodiment, partly in cross section for a non-driven steerable wheel.

FIG. 4 shows as a further embodiment a very simple solution.

Figure 1:
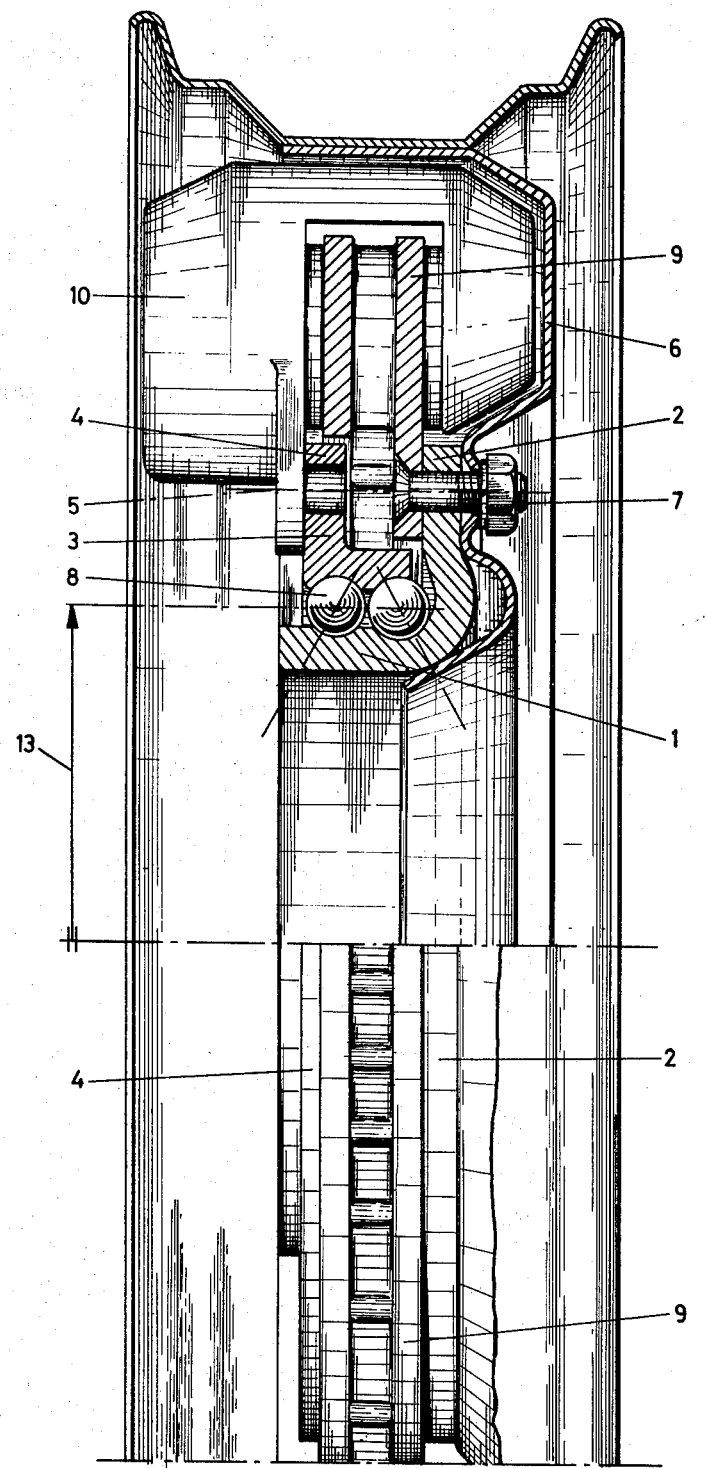
FIG. 1 shows partly in cross section an embodiment of the wheel support for a non-driven wheel.

FIGS. 5a, b and c show different forms of the inner and outer parts of the embodiment of FIG. 4.

The wheel support of FIGS. 1 and 2 comprises an inner structural member 1 with a radial flange 2 and an outer structural member 3 with integral flange 4. Both flanges 2 and 4 are provided with bolt holes at the pitch diameter 5, which holes form the integral connecting means.

To the flange 2 of the structural member 1 a wheel 6 and a brake disc 9 are secured by means of bolts 7.

The calliper or brake block housing 10 is secured to the flange 4. It is shown in the plane of the drawing. Normally this housing is provided on the frontside of the brake disc and accordingly not shown in a vertical section. This follows from FIG. 2 according to which the flange 4 has upper and lower holes 11 for the attachment to the vehicle and holes 12 for the attachment of the calliper.

In the embodiment of FIGS. 1 and 2 a two row biaxial radial ball bearing is used, indicated with the reference 8. Said bearing has a pitch diameter 13 which under the constructional circumstances shown in FIG. 1 is the largest diameter possible.

FIG. 3 shows another embodiment differing primarily from FIGS. 1 and 2 in that the bi-axial radial ball bearing has only one row of balls. In principle this embodiment does not differ much from the one shown in FIGS. 1 and 2. It has an inner structural member 14, a ball row 15 and an outer structural member 16. Both members 14 and 16 have radial flanges, provided with holes 17 and 18 for the insertion of bolts by means of which a wheel 19 can be attached to the inner member 14 together with the brake disc 20, whilst the calliper 21 has been secured to the radial flange of the outer structural member 16.

This outer structural member further has been secured to a King Pin body 22 which with an annular flange 23 lies against the member 16. The King Pin body 22 is cup-shaped and has bearing provisions for a King Pin of which only the axis 24 has been shown.

FIGS. 4 and 5 show the most simple embodiment of the wheel support according to the invention, siad support being made of parts punched out of a flat piece of sheet metal, the inner part 33 and the outer part 34 thereafter being provided with races for one row of balls.

In the same way as in the embodiment of FIG. 3 said balls have two point contact in each race surface.

As follows from FIGS. 5a, b and c said inner and outer parts may have different forms. Thus FIG. 5a shows an outer part 34a, which is substantially square in side elevation and has been provided with bolt holes 35 at the corners.

FIG. 5b shows an embodiment with four diametrically opposed ears 34b with a bolt hole 36.

According to FIG. 5c the outer member 34c is an annular member provided with bolt holes 37.

As far as the inner member is concerned FIG. 5a shows a closed inner part 33a with bolt holes 38, 5b shows an open inner part with inwardly directed ears 33b with bolt holes 39 and FIG. 5c shows an inner annular member 33c with bolt holes 40.

All Figures show non-driven wheels in which the wheel is attached to the inner rotating part.

FIGS. 4 and 5 do not show the wheels themselves but it will be clear from said Figures that the wheel will be attached to the inner part.

What is claimed is:

1. A preassembled support for a disc-braked non-driven wheel of an engine propelled road vehicle comprising inner and outer annular members relatively rotatable about a central axis, said annular member having confronting raceways, a plurality of rolling elements in the annular space between said raceways, each of said members having a radially directed flange, first connecting means on the flange of said outer annular member for detachably connecting the same to the vehicle, second connecting means on the flange of said inner annular member for connecting the same to the wheel and brake disc, the pitch diameter of the pitch circle of said rolling elements being at least twice the overall axial width of said annular members, said connecting means being spaced closely to the pitch circle of the rolling elements whereby forces resulting from functioning of the brake are acting at substantially the same diameter and close to forces from the wheel and reaction forces from the vehicle.

2. A preassembled support as claimed in claim 1 wherein said raceways are formed integrally with said inner and outer members.

3. A preassembled support as claimed in claim 1 wherein the connecting means comprises axially disposed openings in the flanges of said inner and outer members.

4. A preassembled support as claimed in claim 1 wherein the rolling elements comprise a single row of balls.

* * * * *

UNITED STATES PATENT OFFICE
CERTIFICATE OF CORRECTION

Patent No. 3,767,221    Dated October 23, 1973

Inventor(s) Sture Lennart Asberg

It is certified that error appears in the above-identified patent and that said Letters Patent are hereby corrected as shown below:

Page 1 of the patent In re Assignee:

change "Maatschappy" to ---Maatschappij---.

Page 1, Claim for Priority as follows:

[30] Foreign Priority Data: Netherlands

No. 70.01649, filed February 5, 1970

Col. 3, line 5; change "siad" to ---said---.

Signed and sealed this 16th day of July 1974.

(SEAL)
Attest:

McCOY M. GIBSON, JR.        C. MARSHALL DANN
Attesting Officer           Commissioner of Patents

UNITED STATES PATENT OFFICE
CERTIFICATE OF CORRECTION

Patent No. 3,767,221     Dated October 23, 1972

Inventor(s) Sture Lennart Asberg

It is certified that error appears in the above-identified patent and that said Letters Patent are hereby corrected as shown below:

On the cover sheet [73] "Maatschappy" should read

-- Maatschappij --.

Signed and sealed this 3rd day of December 1974.

(SEAL)
Attest:

McCOY M. GIBSON JR.
Attesting Officer

C. MARSHALL DANN
Commissioner of Patents